United States Patent [19]

Conroy et al.

[11] 4,017,194

[45] Apr. 12, 1977

[54] APPARATUS AND METHOD FOR DIFFERENTIATING BETWEEN POLYMER COATED GLASS CONTAINERS AND UNCOATED CONTAINERS

[75] Inventors: Gary D. Conroy, Lancaster; John D. Scott, Sugar Grove, both of Ohio

[73] Assignee: Anchor Hocking Corporation, Lancaster, Ohio

[22] Filed: Sept. 22, 1975

[21] Appl. No.: 615,235

[52] U.S. Cl. .......................... 356/240; 209/111.7 R; 250/223 B; 250/338; 250/341

[51] Int. Cl.² .................. G01N 21/16; G01N 21/32

[58] Field of Search .......................... 356/201, 240; 250/223 B, 338, 341; 209/111.7

[56] References Cited

UNITED STATES PATENTS

| | | | |
|---|---|---|---|
| 2,798,605 | 7/1957 | Richards | 356/240 |
| 2,816,233 | 12/1957 | Krueger | 250/338 |
| 3,351,198 | 11/1967 | Wyman | 356/240 |
| 3,599,002 | 8/1971 | Beutelspacher | 250/201 |
| 3,721,501 | 3/1973 | Atkinson et al. | 350/223 B |

OTHER PUBLICATIONS

"Surlyn Coating Detection on Glass Bottles," E. I. Du Pont de Nemours & Co., Inc.; May 2, 1973.

*Primary Examiner*—Vincent P. McGraw
*Attorney, Agent, or Firm*—Wood, Herron & Evans

[57] ABSTRACT

Glass containers coated with a transparent polymer film, co-mingled with similar but non-coated containers, are identified without contact as they are moving on a conveyor. An optical position sensor triggers a stroboscope to emit a pulse of light that is directed to pass through the container. A light receptor essentially receives only that strobe light which has passed through the center of the container; light passing tangentially through the side of the container is blocked from the receptor. The light is filtered so that the receptor receives substantially only light in a wavelength range which will be attenuated by the polymer coating. Circuitry discriminates between the greater intensity of received light which has passed through an uncoated container and the lesser intensity of light through a coated container. Containers of the one type may be segregated from those of the other type by reject or sorting apparatus.

13 Claims, 3 Drawing Figures

Figure 1:
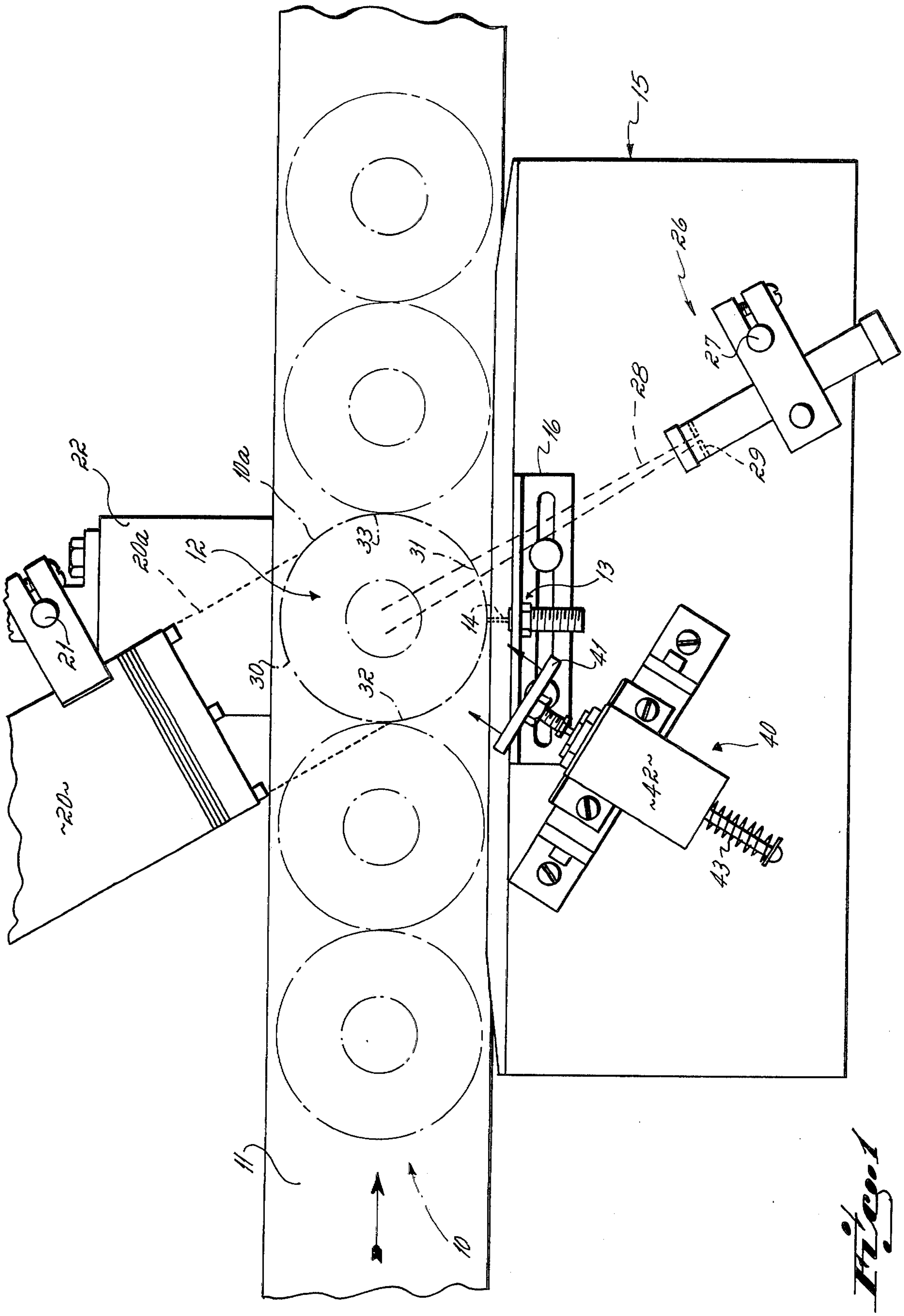

APPARATUS AND METHOD FOR DIFFERENTIATING BETWEEN POLYMER COATED GLASS CONTAINERS AND UNCOATED CONTAINERS

This invention relates to the inspection of glass containers to determine whether they have a protective polymer film coating on them.

In recent years the glass container industry has introduced glass containers which have a polymer coating around their outer surface. Such films are employed because they impart abrasion resistance to the container and make it less susceptible to breakage. Such film coatings are most frequently employed on glass containers for carbonated beverages such as pop bottles.

Containers having such a coating possess different strength and handleability characteristics than similar but non-coating containers. These different characteristics permit or require use of different container filling or handling techniques. Coated and uncoated containers may become co-mingled, especially where they are returned for multiple use. Because of their different handling characteristics, it is important to differentiate between and to segregate containers which are coated, from those which are not. Thus it is desirable to insure, for example, that all containers on a given bottling line are coated containers and that all "bare bottles" are detected and diverted for handling appropriate for them.

The polymer coatings are thin and sometimes almost invisible so that they are difficult to detect quickly, especially on a filling or production line where the containers are moving rapidly. It has been a primary object of this invention to provide a method and apparatus for discriminating between transparent containers which are polymer coated and those which are not, and for separating the former from the latter, for different handling as may be appropriate.

Modern container filling lines often operate at rates in excess of 1000 containers per minute, and up to almost 1500 per minute. Thus a high degree of reliability in operation at high speed is absolutely essential.

It has been a further object of the invention to provide a method and apparatus for differentiating between coated and uncoated glass containers while they are moving in shoulder-to-shoulder contact on a conveyor, and without stopping them or even contacting them, and without moving them off the line through a separate inspecting station.

A number of different polymer materials can be used as container coatings. These include plastisols, as shown in U.S. Pat. No. 3,060,057; polyvinyl chloride, ethylene vinyl acetate, epoxies, and others. Especially useful are the ionic co-polymers of alpha olefins and alpha-beta ethylenically unsaturated or carboxylic acids, generally of the type described in U.S. Pat. No. 3,264,272. One such ionic co-polymer material which is formed from ethylene and methacrylic acid is available commercially from DuPont under the trademark "Surlyn." This material in particular has been promoted in the market by reason of its clarity, elasticity and degree of adherence to glass. At the present time that is perhaps the most widely used transparent coating on glass containers. Further description of several such coatings and methods of applying them are described in the copending application of Herbert C.

Shank, Jr., Ser. No. 378,493, filed July 12, 1973, titled "Color Decorated, Plastic Coated Glass Articles" now U.S. Pat. No. 3,937,853, to which reference is made.

It is, of course, known in the art that various materials, including polymers, can be characterized and identified in accordance with their absorption spectra, by passing light throught the material and determining the absorption at various frequencies. With respect to the "Surlyn" resin commonly utilized for coating glass containers, it has been suggested to the industry by DuPont that the differences in the respective transmission characteristics of the glass and the coating in the ultra-violet region and in the infrared region are sufficient to permit discriminating coated from non-coated bottles. In particular, Surlyn demonstrates a strong absorption band to light of about 2.4$\mu$ (24,000A) wavelength. Soda-lime glass, in contrast, has a low absorption up to about 3$\mu$, so that the infrared light in a wavelength range around 2.4$\mu$ will be more strongly absorbed by coated glass than by uncoated glass.

The possibility of using absorption characteristics to discriminate between coated and uncoated bottles is, however, complexed by the normal rapidity of line movement, and by the shape of the articles. It can be demonstrated that the degree of apparent absorption of light passing through a given bottle depends not only upon the presence or absence of a coating, but also upon the optical path of the light as it passes through the bottle. As an on-line test procedure, it is not useful merely to expose a container to a source of light of polymer-responsive wavelength, without carefully controlling the light path through the container.

In particular, the absorption by a given container will differ greatly depending on whether the light passes through the center of the bottle (i.e., essentially diametrically and perpendicularly through the opposite coated wall portions), or along an off-center chordal or tangential path (i.e., through the sidewall in a direction roughly parallel to the surface thereof). In the latter case, even for an uncoated container, absorption is high because the optical path in the glass is much longer. Moreover, absorption varies significantly with minor changes in bottle position in relation to the light source. In any event, if the absorption is measured on a beam which passes tangentially through the container, it may be so great, even for an uncoated bottle, as to give an erroneous indication of the presence of the polymer coating.

Nevertheless, we have found that these difficulties can be overcome, even for a rapidly moving container, by exposing the container to a very brief stroboscopic light pulse and measuring the absorption only of light which has passed diametrically through the center of the container, but not tangentially through the sides. A container position sensor detects the momentary presence of a moving container in a position of alignment between the stroboscopic source and the light receiver, and triggers firing of the strobe. The position sensor suitably may be a non-contacting optical device which is activated by back reflection, off the container's sidewall, of a locator beam. That portion of the strobe output which passes through the container on a chordal path generally tangentially to a sidewall, surface portion of the container, i.e., longways through the sidewall, is screened or blocked from the receiver-detector.

An output signal is provided by discriminator circuitry which indicates the absence (or the presence, as may be desired in a given installation) of the particular polymer coating on the particular container. The output signal may be in the form of a light or a horn sound, or the output signal may actuate a reject or separator mechanism to divert the detected container from the others.

The presence of a polymer coating on the glass wall attenuates (reduces) the intensity of the received light, in comparison to the intensity of light transmitted through a similar but uncoated container. To achieve maximum discrimination or sensitivity, it is desirable that the light receiver be exposed only to light in a wavelength range which will be absorbed (or scattered or reflected or otherwise reduced in intensity) by the polymer coating. For this purpose, the light is filtered, either between the strobe and the container, or on the other side, between the container and the light receptor, so that the light which falls on the receptor preferably is primarily of wavelengths in a range which is susceptible of being reduced in intensity by the particular polymer coating. For detection of a "Surlyn" type coating, this is preferably done by use of a xenon arc strobe and a dielectric filter which will pass wavelengths appoximately in the 2.26 to 2.54$\mu$ wavelength range.

It is an important aspect of the invention that the receptor "see" only light from the strobe which has passed through the center of the particular container, and that light which has passed tangentially through the sidewall be screened from it. This can be done most conveniently, as a practical matter, by utilizing a receptor having a narrow acceptance angle, in combination with a relatively wide aperture stroboscopic source. It is further desirable to collimate the beam from the source, by using a parabolic mirror, so that the light beam will be essentially parallel.

Figure 2:
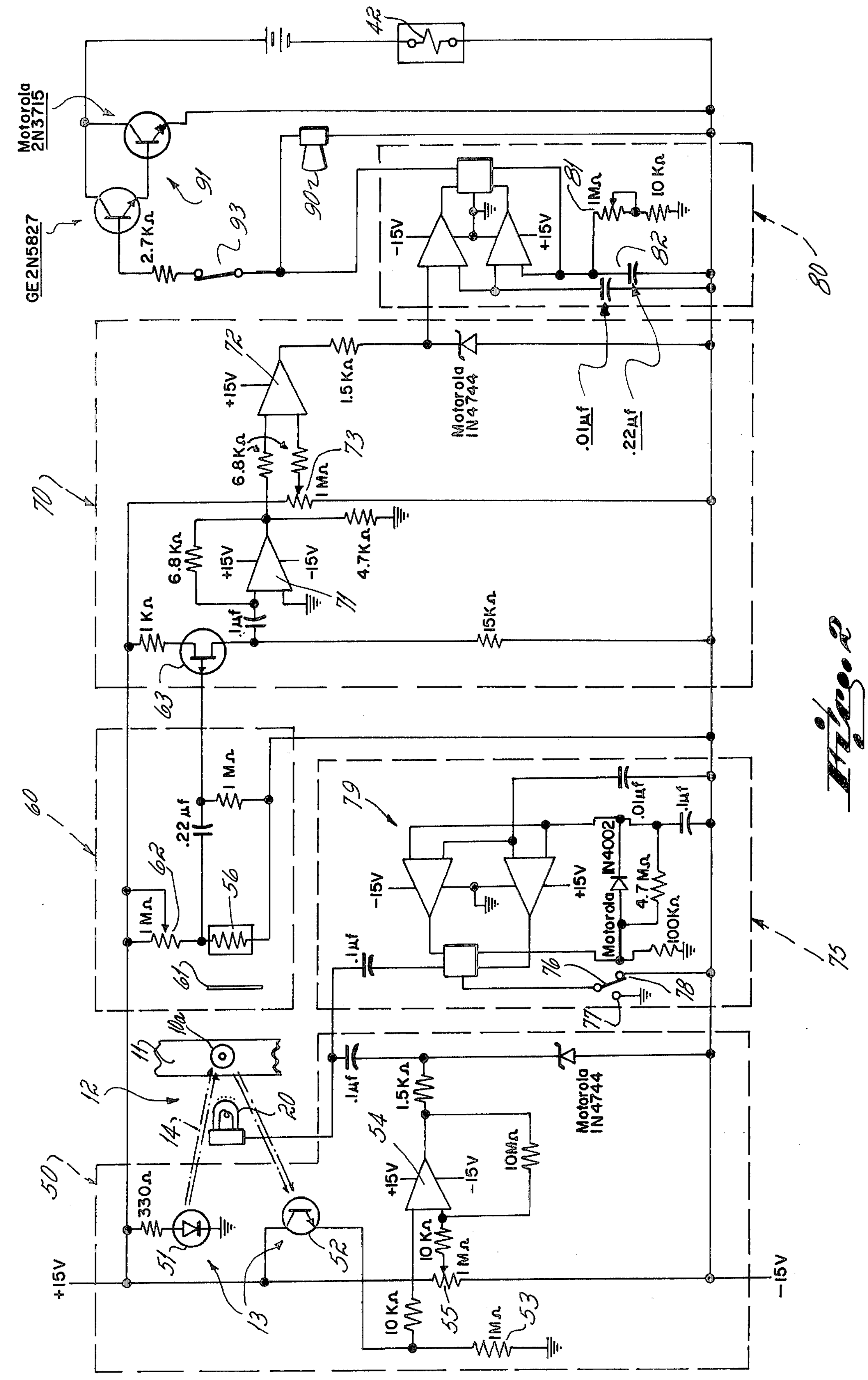
Figure 3:
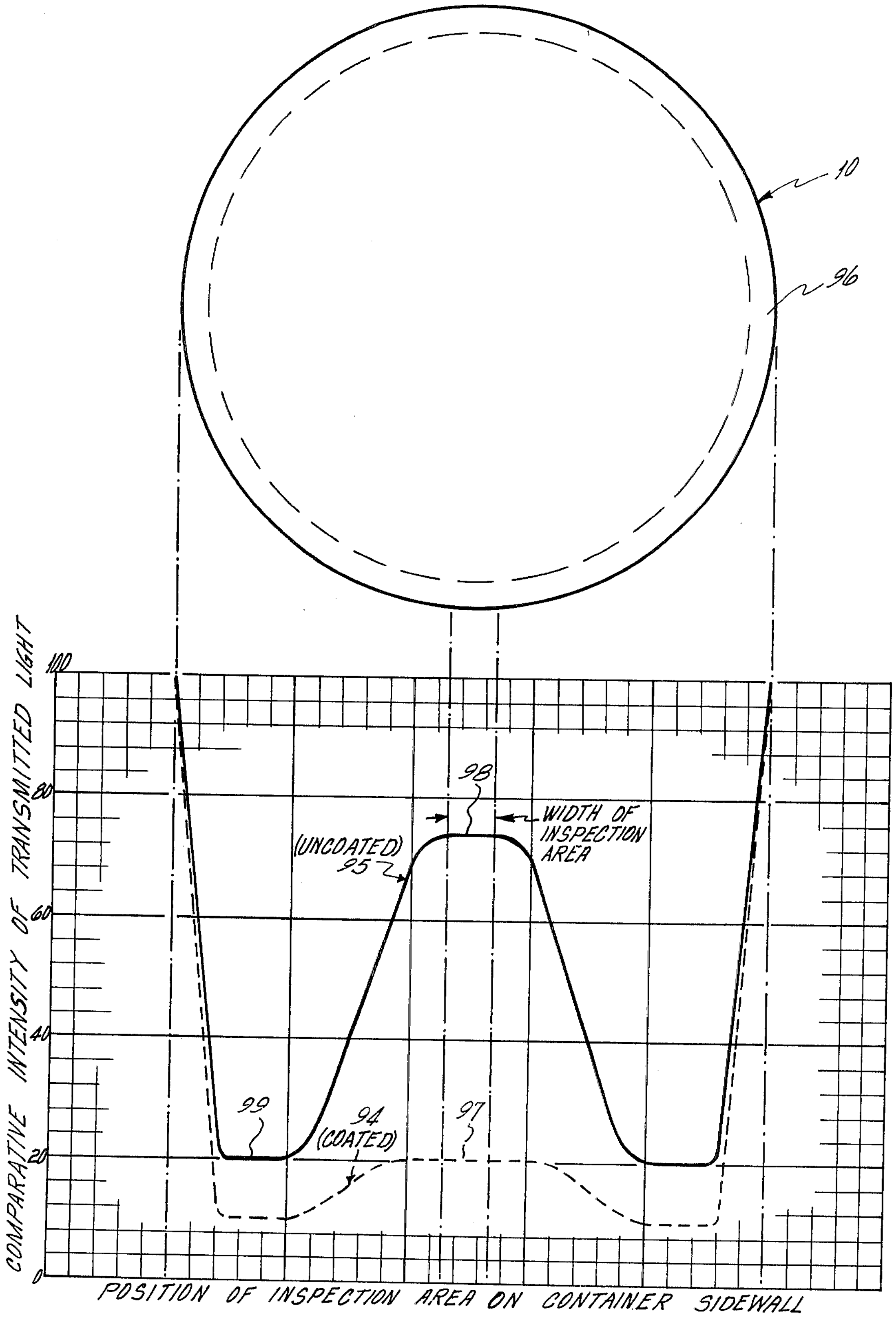

The invention can best be further described by reference to the accompanying drawing in which, FIG. 1 is a top plan view of a preferred form of structure in accordance with the apparatus aspect of the invention, and for carrying out the method aspect of the invention, FIG. 2 is a circuit diagram of a preferred form of circuitry for use with the apparatus of FIG. 1, and FIG. 3 is a diagrammatic illustration showing the variation of intensity of transmitted light as a function of the light beam path, for a coated and an uncoated glass container.

In FIG. 1, apparatus in accordance with the preferred embodiment of the invention is shown as used to detect bare bottles in a line of bottles, each designated by 10, moving in single file, shoulder-to-shoulder contact, on a single line conveyor 11. Conveyor 11 itself may be conventional and in practice may for example move containers at speeds up to 1200 bottles per minute, in the direction of the arrow.

The transient presence of a bottle **10*a* at a "read" position in an inspection area or station 12, is determined by position sensing means 13. In preferred form, sensing means 13 includes a light source, for example a light emitting diode 51 (not visible in FIG. 1, and described in connection with the circuitry of FIG. 2). Diode 51 emits a narrow beam of light 14 which impinges on and is reflected (at least in part) from bottle 10*a*, by the sidewall, whether the bottle is coated or not. In the apparatus illustrated by way of example, the reflected beam lies in the same vertical plane as the incident beam, although this is not critical. Sensor 13 includes a reflection detector in the form of a phototransistor 52 (see FIG. 2) suitably positioned to receive light reflected from a bottle 10*a*, at the read position. The element 52 is preferably positioned adjacent to the light source 51 (in the FIG. 1 embodiment, directly below it) such that when the bottle is in the read position, the incident beam will be reflected 180° back to the detector. The incident and reflected light paths are shown by the dotted lines at 14. By reason of the curvature of the bottle sidewall, the wall will reflect the incident beam away from photo transistor 52, except when the bottle is at read position; prior to reaching that position, and after having moved beyond it, the light is reflected away. The light source 51** is continuous, but bottles are thus sensed intermittently.

The position sensor means 13 is mounted to a frame 15 by a bracket 16 and may be adjustable for setup positioning in relation to other components of the apparatus to be described.

The light actuated means just described functions to sense when a bottle (whether coated or not) is in position to be illuminated by the strobe and the presence of a coating properly read. It should be understood that non-optical means, such as a mechanical feeler gauge, could be used for this purpose in place of the optical sensor of the preferred embodiment.

Through circuitry shown in FIG. 2, sensing means 13 is operatively connected to trigger or fire the stoboscopic light source designated generally at 20. For use in detecting bottles coated with Surlyn polymer, the strobe is preferably a xenon arc which, when triggered, emits light in the wavelength range of 0.25 to 3.0$\mu$. The strobe may have a relatively wide aperture which, as shown in the drawing, emits a beam **20*a*** that approximates the diameter of the bottle, although this is not critical. The beam is collimated by means not shown so that it is essentially parallel.

Strobe 20 is mounted to a standard 21 which extends upwardly from a portion 22 of frame 15 that projects beneath belt 11, to the side thereof opposite the position sensing means 13. It is desirable that the strobe be aimed at an acute angle to the direction of line movement, to facilitate its positioning with respect to that of an infrared receptor, generally at 26 on the opposite side of belt 11, and with respect to a reject mechanism 40.

The light receptor 26 is adjustably mounted to a standard 27 which projects upwardly from frame 15, and is aligned to receive light emitted by the strobe which passes diametrically through the center of the bottle **10*a*, in the read position. The receiver 26 accepts light only in a narrow acceptance angle 28, preferably about 6°, which is established by internal masking means 29 indicated by the dash lines. This corresponds to a scanning area about ½ inch wide on the container wall. The received light thus has passed essentially perpendicularly through the sidewalls of bottle 10*a*, as indicated at 30 and 31. Light from the strobe which passes tangentially through the bottle sidewalls, i.e., parallel thereto as indicated at 32 and 33**, is screened from the receptor.

When a bare bottle is detected by the perceived high intensity (i.e., unabsorbed) light from the strobe, as hereinafter to be described, the bottle can be separated from other bottles 10 in the line by automatic actuation of a solenoid pusher generally at 40. The solenoid is mounted to frame 15 and includes an armature having a headplate 41 which, when energized by the solenoid coil 42, moves in the direction indicated by the arrows in FIG. 1, to shove the detected bottle off the line, toward suitable collecting means not shown. The armature is returned by a bias spring 43.

FIG. 2 shows a preferred form of circuitry by which the position sensing means 13 responds to the presence of a moving bottle at the read position in inspection station 12, to fire strobe 20. The circuit also discriminates as to whether the bottle is coated or uncoated, and directs rejection or sorting of an uncoated bottle. In the figure, the bottle position sensing circuit is shown within dashed lines designated generally by 50. As bottle 10, on conveyor belt 11, passes the position sensor 13, the bottle sidewall reflects a light beam for the infrared light emitting diode 51. The reflected beam impinges on a photo-transistor 52, when but only when the bottle is at the read position, i.e., the positon of diametric alignment between the strobe and the receptor 26. The resulting voltage across photo-transistor load resistor 53 forms the input to comparator 54.

Comparator 54 compares the voltage which is input from photo-transistor load resistor 53 with a known comparison reference voltage input from potentiometer 55. When the voltage drop across photo-transistor load resistor 53 exceeds the trigger threshold voltage which is input from potentiometer 55, the output of comparator 54 goes high, and this triggers strobe 20. This comparison reference voltage is so selected that the signals from reflection off both coated and uncoated bottles will exceed it, the strobe will fire for each bottle, but only when a bottle is in position for making a determination as to whether it is coated. The strobe may be of known type and may provide a broad band of output light. Desirably it should be capable of providing a constant light output over a range from 1 to 2000 flashes per minute, to accommodate high line speed.

A preferred form of light receiver is shown within dashed lines at 60. A filter 61, which in this case is suitably selected to pass light of 2.41 micron wavelength, is interposed between bottle 10*a* and photoconductive cell 56. The flash from strobe 20 passes through bottle 10*a* and through filter 61 and impinges on photoconductive cell 56, which is masked or screened by a narrow aperture so that it sees only light which has passed essentially diametrically through the center of the bottle. The magnitude of the resulting current which flows in photoconductive cell 56 is dependent upon the intensity of the filtered light after passing diametrically through bottle 10. A variable resistor 62 is provided to adjust the sensitivity of the photoconductive cell 56. Variations in the intensity of 2.41 micron wavelength light which impinges on photoconductive cell 56 cause the photoconductive cell current to change, which results in a voltage drop across resistor 62.

The voltage across resistor 62 is applied to a high input impedance amplifier 63 of unity gain, which is shown as part of the discriminator circuitry within dashed lines at 70 in FIG. 2. The output of amplifier 63 is connected to the input of an inverting amplifier 71, which has a gain of approximately one hundred. The output of inverting amplifier 71 is applied to comparator 72.

Comparator 72 compares the input voltage from inverting amplifier 71 with a voltage from potentiometer 73. When the voltage from inverting amplifier 71 exceeds the voltage from potentiometer 73, the output of comparator 72 is low and triggers a pulse timer 80. Potentiometer 73 is adjusted to positively bias-off comparator 72 and hold the output of comparator 72 high until the voltage from inverting amplifier 71, which is dependent upon the intensity of 2.4 micron wavelength light impinging on photoconductive cell 56, rises to a level which indicates that bottle 10*a* is uncoated. For ordinary ambient light, and for the detected strobe light if bottle 10*a* is coated, the voltage input from inverting amplifier 71 will not exceed the threshold which is established by adjusting potentiometer 73. Thus, the output of comparator 72 goes low only when bottle 10*a* is uncoated.

The output of comparator 72 is applied to a pulse timer, generally at 80. This timer is triggered into operation only when an uncoated bottle is sensed, and it produces an output pulse of a certain timed duration. The duration of the output pulse is determined by an RC network that includes a variable resistor 81 and comparator 82. The resistor may be adjusted, for example, to provide an output pulse of sufficient duration to produce an audible sound from horn 90, or to a light, not shown, and/or to close transistor switch 91 for a sufficient time that the solenoid coil 42 of reject mechanism 40 is energized so that the bottle is pushed off belt 11. Switch 93 is opened to disconnect reject solenoid 42 from the output of pulse timer 80 during the set-up operation which is discussed above.

A set-up circuit at 75 in FIG. 2 is preferably provided to facilitate initial adjustment of variable resistor 62, which establishes the sensitivity of photoconductive cell 56, and to facilitate adjustment of potentiometer 73 which establishes the threshold voltage input to comparator 72. Switch 76 is switched to position 77 for the set-up operation.

Readjustment of variable resistor 62 and/or potentiometer 73 is necessary when a ddifferent type of bottle is to be inspected. The set-up circuit 75 includes a free running multivibrator at 79, which generates trigger pulses for strobe 20 so that variable resistor 62 and potentiometer 73 can be adjusted without line operation, and with a single stationary bottle in the read position. During on-line inspection, switch 76 is switched to position 78 which inhibits the free running multivibrator by holding the set-up circuit 75 output to strobe 20 low, thus preventing the set-up circuit 75 from triggering the strobe.

In FIG. 2, suitable parameters are given by way of example for various circuit components. By way of further example, the other suitable components are:

diode 51 and photo-transistor 52 — Scanamatic Corp. S-3010-3 comparator 54 — RCA 741 high input impedance amplifier 63 — RCA 3N139 set-up circuit 75 and pulse timer 80 — Signetics SE 556 inverting amplifier 71 and comparator 72 — 747 photoconductive cell 56 — Optoelectronics, Inc., K0-25-53

From the foregoing it can be seen that the receptor 26 is in a receiving condition at all times, but that only the relatively intense light received by it from a strobe flash, transmitted through a bare bottle, will activate the reject mechanism. This arrangement presents an advantage in that it eliminates the complex and expensive gating circuitry that would otherwise be required to turn on a normally off receptor or place it in actuatable condition, when a bottle is in read position.

FIG. 3 shows how the intensity of transmitted light varies according to its path through a container 10. Curve 94 shows the relative intensities for different optical paths, as measured on a Surlyn coated 64. oz. "Coca-Coal" bottle, while curve 95 shows the values for a similar but uncoated bottle. Intensity was read by a detector having an acceptance angle of 6°; this corresponded to a scanning area about ½inch wide on the container wall. From the figure, it can be seen that the intensity values for the coated bottle are much less than those for the uncoated bottle, but only for corresponding paths. The intensity 99 of light passing tangentially through the container sidewall (as designated at 96) was only about 20% of the incident intensity, for the uncoated bottle; this value approximates the intensity 97 of light passing through a coated bottle at the center. Thus, absent means to insure that the beam always passed on the same path, a low measured intensity would not afford a basis for discrimination. However, if the light beam inspection area is confined essentially to the center, then the comparative intensities are about 70–80%, at 98 for the uncoated bottle, versus only about 20% at 97 for the coated bottle. It can further be seen that a narrow acceptance is important because intensity changes sharply off center. Thus, by measuring a beam essentially through the center, a good basis for accurate discrimination is afforded by the invention.

What is claimed is:

1. Apparatus for inspecting glass containers to determine the presence of a polymer coating thereon, comprising, means for moving the containers in single file along a path, a stoboscopic light source triggerable to emit a pulse of light which will impinge on a container moving along said path, position sensing means for sensing the moment when a container is in a read position while moving along said path, said position sensing means being operatively connected to trigger said source to emit a single pulse of light which is synchronized to impinge on the respective container whose position was sensed at the read position, light-sensitive receptor means for receiving light from said source which has passed through the respective container, said receptor means receiving only light from said source which has passed substantially diametrically through the center of said respective container, means blocking said receptor means from receiving light from said source tangentailly through the side wall of the respective container, and continuously receptive circuit means responsive to the intensity of the single pulse of light received by said receptor means to produce an output signal indicative of whether the respective container has a polymer coating on it.

2. The apparatus of claim 1 wherein the position sensing means comprises a non-contact optical sensor wherein a beam of light is reflected from the container to the sensing means, only when the container is at said read position.

3. The apparatus of claim 1 wherein said stroboscopic light source is a xenon arc producing a columinated output in a wavelength range of about $2.4\mu$.

4. The apparatus of claim 1 wherein the receptor means has a narrow acceptance angle capable of receiving only light which has passed essentially through the center of said container.

5. The apparatus of claim 1 further including means for filtering light from said pulse before reception by said receptor means, to limit light received by said receptor means to a range of wavelengths which will be attenuated by a polymer coating on the respective container if the respective container has a polymer coating.

6. The apparatus of claim 1 wherein the circuit means produce said output signal only when the respective container has no polymer coating on it.

7. The apparatus of claim 1 wherein said circuit means includes a comparator which compares the magnitude of a signal reflecting the intensity of the received pulse with a signal of predetermined magnitude.

8. The apparatus of claim 7 wherein said circuit means produces an output pulse signal when the intensity of the received pulse is of greater magnitude than the signal of predetermined magnitude, said output pulse signal thereby corresponding to detection of an uncoated container.

9. The method of inspecting glass containers to determine the presence of a polymer coating on the outside of the respective container, comprising, moving the container along a path, sensing the momentary presence of the container at a read position, firing a stroboscope synchronously to emit a single pulse of light when said container is at said read position, directing light from said stroboscope through the sidewall of said container, detecting light from the stroboscope which has passed essentially diametrically through the center of the container, while blocking light passing tangentailly through the sidewall of the container, comparing the intensity of the single pulse of light with a reference signal to determine the relative absorption of the detected light in passing through the container, and providing an output reflecting said comparison and indicative of whether the container has a polymer coating on it.

10. The method of claim 9 wherein the presence of said container at said read position is sensed while the container is moving in uninterrupted motion along said path.

11. The method of claim 9 wherein the presence of said container at said read position is sensed while said container is in shoulder-to-shoulder contact with other containers moving in single row along said path.

12. The method of claim 9 wherein the position of said container at said read position is sensed optically be reflection of the light beam off the moving container to a detector.

13. The apparatus of claim 1 wherein said circuit means is in receiving condition at all times, but responds only to pulses of an intensity greater than a preset value.

* * * * *